(12) United States Patent
Tafazoli Bilandi et al.

(10) Patent No.: US 8,843,279 B2
(45) Date of Patent: Sep. 23, 2014

(54) METHOD AND APPARATUS FOR DETERMINING A SPATIAL POSITIONING OF LOADING EQUIPMENT

(75) Inventors: Shahram Tafazoli Bilandi, Vancouver (CA); Amir Mohammad Ahani, North Vancouver (CA); Abdol Rasul Rasuli, North Vancouver (CA)

(73) Assignee: Motion Metrics International Corp., Vancouver, B.C. (CA)

( * ) Notice: Subject to any disclaimer, the term of this patent is extended or adjusted under 35 U.S.C. 154(b) by 778 days.

(21) Appl. No.: 13/154,230

(22) Filed: Jun. 6, 2011

(65) Prior Publication Data
US 2012/0308354 A1 Dec. 6, 2012

(51) Int. Cl.
| | | |
|---|---|---|
| *G06F 7/70* | (2006.01) | |
| *E02F 9/26* | (2006.01) | |
| *B66C 13/46* | (2006.01) | |
| *E02F 9/20* | (2006.01) | |
| *A01B 79/00* | (2006.01) | |
| *A01B 69/04* | (2006.01) | |

(52) U.S. Cl.
CPC ............... *E02F 9/264* (2013.01); *E02F 9/2045* (2013.01); *E02F 9/2025* (2013.01); *A01B 79/005* (2013.01); *A01B 69/008* (2013.01); *E02F 9/26* (2013.01); *B66C 13/46* (2013.01)
USPC ................... 701/50; 404/72; 404/75; 506/30

(58) Field of Classification Search
CPC ......... E02F 9/2025; E02F 9/26; E02F 9/2045; A01B 79/005; A01B 69/008
USPC ..................... 600/37, 587; 606/151; 604/909; 128/899; 404/72, 75; 701/50; 114/125; 356/4.01, 5.01, 3.01; 209/597, 604; 506/28; 422/107; 136/249; 414/790.6; 198/464.3
See application file for complete search history.

(56) References Cited

U.S. PATENT DOCUMENTS

| | | | |
|---|---|---|---|
| 5,160,055 A | 11/1992 | Gray | |
| 5,401,115 A * | 3/1995 | Musil et al. ..................... | 404/72 |
| 5,445,282 A | 8/1995 | Erikkilä | |
| 5,539,516 A | 7/1996 | Heinrich et al. | |
| 5,729,339 A | 3/1998 | Park et al. | |
| 6,028,432 A | 2/2000 | Doemens et al. | |
| 6,223,110 B1 | 4/2001 | Rowe et al. | |
| 6,329,139 B1 * | 12/2001 | Nova et al. ..................... | 506/30 |

(Continued)

FOREIGN PATENT DOCUMENTS

| | | |
|---|---|---|
| WO | WO 2009/095577 A1 | 8/2009 |
| WO | WO 2009/121122 A1 | 10/2009 |

*Primary Examiner* — Behrang Badii
(74) *Attorney, Agent, or Firm* — Christie, Parker & Hale, LLP

(57) ABSTRACT

An apparatus, method and sensor apparatus for determining a spatial positioning of loading equipment is disclosed. The loading equipment has an operating implement for loading a payload, the operating implement being coupled to a support for movement relative to the support. The apparatus includes an orientation sensor disposed on the support and being operable to produce an orientation signal representing an orientation of the support. The apparatus also includes a displacement sensor operable to produce a displacement signal representing a displacement of the operating implement relative to the support. The apparatus further includes a processor circuit operably configured to receive the orientation signal and the displacement signal, use a kinematic model of the loading equipment to compute a spatial positioning of the loading equipment, and produce an output signal representing the spatial positioning.

49 Claims, 9 Drawing Sheets

(56) References Cited

U.S. PATENT DOCUMENTS

| | | |
|---|---|---|
| 6,363,173 B1 | 3/2002 | Stentz et al. |
| 6,363,632 B1 | 4/2002 | Stentz et al. |
| 6,496,766 B1 | 12/2002 | Bernold et al. |
| 6,536,615 B2 | 3/2003 | Nishikino et al. |
| 6,843,383 B2 | 1/2005 | Schneider et al. |
| 6,894,621 B2 | 5/2005 | Shaw |
| 6,985,085 B1 | 1/2006 | Brown |
| 7,079,931 B2 | 7/2006 | Sahm et al. |
| 7,489,098 B2 | 2/2009 | Harris et al. |
| 7,490,728 B2 | 2/2009 | Schobesberger |
| 2005/0128465 A1* | 6/2005 | Skultety-Betz et al. ..... 356/4.01 |
| 2008/0047170 A1 | 2/2008 | Nichols |
| 2009/0112472 A1 | 4/2009 | Montgomery |
| 2010/0052684 A1 | 3/2010 | Fling et al. |

* cited by examiner

| | $\theta_i$ | $d_i$ | $a_i$ | $\alpha_i$ |
|---|---|---|---|---|
| $o_0$ | $\theta_1$ | 0 | $a_1$ | $\pi/2$ |
| $o_1$ | $\theta_2$ | 0 | $a_2$ | 0 |
| $o_2$ | $\theta_3$ | 0 | $a_3$ | $\pi/2$ |
| $o_3$ | 0 | $d_4$ | 0 | 0 | ized
METHOD AND APPARATUS FOR DETERMINING A SPATIAL POSITIONING OF LOADING EQUIPMENT

BACKGROUND OF THE INVENTION

1. Field of Invention

This invention relates generally to equipment for loading of a payload and more particularly to an apparatus for determining a spatial positioning of the loading equipment.

2. Description of Related Art

Operation of heavy loading equipment such as electric mining shovels and cranes generally involves an operator controlling the equipment based on visual feedback of the position of an operating implement of the equipment. However, the operator's view of the operating implement and surrounding environment may be constrained by a limited field of view or perspective due to the operator's location in a cab of the loading equipment. For example, in electric mining shovels (also called cable shovels or rope shovels) used for excavating and loading ore using a dipper, the placement of the operator in the cabin is quite removed from the actual operation of the dipper.

Collision between loading equipment and objects or obstacles in the surrounding environment is a serious safety concern, and may also result in damage to the loading equipment. It is also possible that an operator may overload and overstress the operating components of loading equipment by subjecting the equipment to excessive forces, due to a lack of feedback from the controls.

Monitoring systems that sense the spatial positioning of components of the loading equipment on the basis of relative displacement between components have two drawbacks:

(1) They usually require re-initiation from time to time to calibrate the system as they may rely on signals generated by sensors such as potentiometers or resolvers, for example. When the loading equipment is powered down, the calibration information may be lost and the system will require recalibration.

(2) Mining shovels also typically operate in a harsh environment in which there is high likelihood of sensors on the operating components being damaged due to impact or due to ingress of dirt and debris. Systems that rely on signals produced from a plurality of sensors disposed at different locations on key components of the equipment are particularly prone to failure.

There remains a need for improved methods and apparatus of monitoring the spatial positioning of operating implements of loading equipment.

SUMMARY OF THE INVENTION

In accordance with one aspect of the invention there is provided an apparatus for determining a spatial positioning of loading equipment, the loading equipment having an operating implement for loading a payload, the operating implement being coupled to a support for movement relative to the support. The apparatus includes an orientation sensor disposed on the support and being operable to produce an orientation signal representing an orientation of the support. The apparatus also includes a displacement sensor operable to produce a displacement signal representing a displacement of the operating implement relative to the support. The apparatus further includes a processor circuit operably configured to receive the orientation signal and the displacement signal, use a kinematic model of the loading equipment to compute a spatial positioning of the loading equipment, and produce an output signal representing the spatial positioning.

The orientation sensor and the displacement sensor may be operable to produce updated orientation and displacement signals during movement of the operating implement and the processor circuit may be operably configured to receive the updated signals and produce an output signal representing a dynamically updated spatial positioning of the loading equipment.

The displacement sensor may be disposed on the support.

The orientation and the displacement sensors may be each disposed within a sensor housing mounted on the support.

The displacement sensor may be disposed on the operating implement.

The orientation signal may include information indicating at least a cardinal heading of the support, and a pitch angle of the support.

The orientation signal may further include a roll angle of the support.

The apparatus may include an interface in communication with the processor circuit and being operably configured to receive coordinates defining a location of the loading equipment with respect to an earth coordinate system, and the processor circuit may be operably configured to use the coordinates and the computed spatial positioning to compute a location of the operating implement with respect to the earth coordinate system.

The loading equipment may include a mining shovel and the processor circuit may be operably configured to correlate the computed location of the operating implement with map data representing a yield expected from ore at the location of the operating implement to provide a yield estimate for the ore loaded in the operating implement.

The interface may be operably configured to receive GPS coordinates defining the location of the loading equipment.

The orientation sensor may include a plurality of sensor elements coupled to a microprocessor circuit, the microprocessor circuit being operably configured to produce the orientation signal in response to receiving signals from the plurality of sensor elements.

The displacement sensor may include a laser rangefinder sensor, the laser rangefinder sensor being operable to direct a laser beam at a target located proximate the operating implement to determine the displacement of the operating implement relative to the support.

The processor circuit may be operably configured to produce the output signal by producing a display signal operable to cause a representation of the loading equipment to be displayed on a display for communicating the spatial positioning to an operator of the loading equipment.

The processor circuit may be operably configured to produce the display signal by producing a display signal operable to cause display of at least one of an elevational representation of the loading equipment indicating the spatial positioning of the loading implement with respect to the loading equipment, and a plan representation of the loading equipment indicating a heading of the operating implement.

The apparatus may include a transmitter operably configured to transmit the output signal to a remote location to facilitate remote monitoring of loading equipment operations.

The transmitter may include a wireless transmitter.

The loading equipment may include a mining shovel having a boom extending outwardly from a frame, the support being pivotably coupled to the boom, the operating implement including a dipper handle having first and second ends, the first end being coupled to a dipper for loading ore from a mine face, the second end being received in the support and being coupled to a drive operable to cause linear reciprocating motion of the dipper handle and dipper with respect to the support, and the displacement sensor is may be operably configured to receive a displacement signal representing a generally linear displacement between the support and the dipper.

The apparatus may include a sensor, disposed on the frame and the processor circuit may be operably configured to receive a signal representing a pitch angle of the frame and a roll angle of the frame, and use the pitch and roll angles of the frame to compute an orientation of the frame prior to computing the spatial positioning of the loading equipment.

The processor circuit may be operably configured to generate a kinematic model of the mining shovel a coupling between a crawler platform where the frame is modeled as a first revolute joint, a coupling between the frame and the boom is modeled as a second revolute joint, a coupling between the boom and the support is modeled as a third revolute joint, and a coupling between the dipper handle and the support is modeled as a prismatic joint.

The dipper may be pivotably coupled to the first end of the dipper handle and may include an adaptor for coupling to a hoist cable, the hoist cable extending over a point sheave disposed at a distal end of the boom, the hoist cable being operable to move the dipper about the first end of the dipper handle and to move the dipper and dipper handle about the support during loading operations, and the processor circuit may be operably configured to compute an orientation and position of the adaptor based on a dipper tip and point sheave locations, compute a length of the hoist cable between the adaptor and the point sheave, compute a rotation of a sheave wheel based on the hoist cable displacement, and produce the output signal by producing an output signal representing an orientation and position of the hoist cable and adaptor.

The spatial positioning signal may be encoded with values representing the orientation and displacement, and the processor circuit may be operably configured to extract the values, and determine compliance of the values with a set of validity criteria prior to using the kinematic model of the loading equipment to compute the spatial positioning of the operating implement.

The processor circuit may be operably configured to compute at least one of a cyclic activity parameter associated with operation of the loading equipment, and a maximum swing angle and frequency associated with a side to side swing of a rotating platform of the loading equipment.

The output signal representing the spatial positioning may be further provided to an image processing system, the image processing system being operably configured to capture and process images of the operating implement to determine at least one of a condition of the operating implement, and a condition of a payload loaded by the operating implement.

In accordance with another aspect of the invention there is provided a method for determining a spatial positioning of loading equipment, the loading equipment having an operating implement for loading a payload, the operating implement being coupled to a support for movement relative to the support. The method involves receiving spatial positioning signals including an orientation signal from an orientation sensor disposed on the support, the orientation signal representing an orientation of the support. The method also involves receiving a displacement signal from a displacement sensor, the displacement signal representing a displacement of the operating implement relative to the support. The method further involves, in response to receiving the spatial positioning signals, using a kinematic model of the loading equipment to compute a spatial positioning of the loading equipment, and producing an output signal representing the spatial positioning.

The orientation sensor and the displacement sensor may be operable to produce updated orientation and displacement signals during movement of the operating implement and receiving the spatial positioning signals may involve receiving the updated signals and producing the output signal may involve producing an output signal representing a dynamically updated spatial positioning of the loading equipment.

Receiving the spatial positioning signals may involve receiving a displacement signal from a displacement sensor disposed on the support.

Receiving the orientation signal and receiving the displacement signal may involve receiving orientation and displacement signals from respective orientation and displacement sensors each disposed in a sensor housing mounted on the support.

Receiving the spatial positioning signals may involve receiving a displacement signal from a displacement sensor disposed on the operating implement.

Receiving the orientation signal may involve receiving a signal including information indicating at least a cardinal heading of the support, and a pitch angle of the support.

Receiving the orientation signal may involve receiving a signal including information indicating a roll angle of the support.

The method may involve receiving coordinates defining a location of the loading equipment with respect to an earth coordinate system, and using the coordinates and the computed spatial positioning to compute a location of the operating implement with respect to the earth coordinate system.

The loading equipment may include a mining shovel and the method may further involve correlating the computed location of the operating implement with map data representing a yield expected from ore at the location of the operating implement to provide a yield estimate for the ore loaded in the operating implement.

Receiving the coordinates may involve receiving GPS coordinates defining the location of the loading equipment.

Receiving the orientation signal from the orientation sensor may involve receiving a signal from a sensor may involve a plurality of sensor elements coupled to a microprocessor, the microprocessor being operably configured to produce the orientation signal in response to receiving signals from the plurality of sensor elements.

Receiving the displacement signal from the displacement sensor may involve receiving a signal from a laser rangefinder sensor, the laser rangefinder sensor being operable to direct a laser beam at a target located proximate the operating implement to determine the displacement of the operating implement relative to the support.

Producing the output signal may involve producing a display signal operable to cause a representation of the loading equipment to be displayed on a display, the representation being operable to communicate the spatial positioning to an operator of the loading equipment.

Producing the display signal may involve producing a display signal operable to cause display of at least one of an elevational representation of the loading equipment indicating the spatial positioning of the loading implement with respect to the loading equipment, and a plan representation of the loading equipment indicating a heading of the operating implement.

The method may involve transmitting the output signal to a remote location to facilitate remote monitoring of loading equipment operations.

Transmitting the output signal may involve wirelessly transmitting the output signal to the remote location.

The loading equipment may include a mining shovel having a boom extending outwardly from a frame, and the support may be pivotably coupled to the boom, the operating implement including a dipper handle having first and second ends, the first end being coupled to a dipper for loading ore from a mine face, the second end being received in the support and being coupled to a drive operable to cause linear reciprocating motion of the dipper handle and dipper with respect to the support, and receiving the displacement signal may involve receiving a signal representing a generally linear displacement between the support and the dipper.

The method may involve receiving a signal representing a pitch angle of the frame and a roll angle of the frame, and using the pitch and roll angles of the frame to compute an orientation of the frame prior to computing the spatial positioning of the loading equipment.

Using the kinematic model of the loading equipment to compute the spatial positioning of the operating implement may involve generating a kinematic model of the mining shovel where a coupling between a crawler platform and the frame may be modeled as a first revolute joint, a coupling between the frame and the boom is modeled as a second revolute joint, a coupling between the boom and the support is modeled as a third revolute joint, and a coupling between the dipper handle and the support is modeled as a prismatic joint.

The dipper may be pivotably coupled to the first end of the dipper handle and may include an adaptor for coupling to a hoist cable, the hoist cable extending over a point sheave disposed at a distal end of the boom, the hoist cable being operable to move the dipper about the first end of the dipper handle and to move the dipper and dipper handle about the support during loading operations, and the method may further involve computing an orientation and position of the adaptor based on a dipper tip and point sheave locations, computing a length of the hoist cable between the adaptor and the point sheave, computing a rotation of a sheave wheel based on the hoist cable displacement, and producing the output signal may involve producing an output signal representing an orientation and position of the hoist cable and adaptor.

Receiving the spatial positioning signals may further involve receiving a spatial positioning signal encoded with values representing the orientation and displacement, extracting the values, and determining compliance of the values with a set of validity criteria prior to using the kinematic model of the loading equipment to compute the spatial positioning of the operating implement.

The method may involve computing at least one of a cyclic activity parameter associated with operation of the loading equipment, and a maximum swing angle and frequency associated with a side to side swing of a rotating platform of the loading equipment.

The method may involve providing the output signal representing the spatial positioning to an image processing system, the image processing system being operably configured to capture and process images of the operating implement to determine at least one of a condition of the operating implement, and a condition of a payload loaded by the operating implement.

In accordance with another aspect of the invention there is provided a sensor apparatus for producing spatial positioning signals for determining a spatial positioning of loading equipment, the loading equipment having an operating implement for loading a payload, the operating implement being coupled to a support for movement relative to the support. The sensor apparatus includes a housing operably configured to be mounted on the support, an orientation sensor and a displacement sensor disposed within the housing and being operably configured to produce spatial positioning signals including an orientation signal representing an orientation of the support, and a displacement signal representing a displacement of the operating implement relative to the support.

The apparatus may include a processor circuit operably configured to receive the spatial positioning signals, to use a kinematic model of the loading equipment to compute a spatial positioning of the operating implement with respect to the loading equipment, and to produce an output signal representing the spatial positioning of the operating implement.

The support may be disposed in a location that is exposed to an environment surrounding the loading equipment and the sensor apparatus may further include a connector port operably configured to receive a cable for conveying the spatial positioning signals to a processor circuit located in an enclosed location on the loading equipment.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
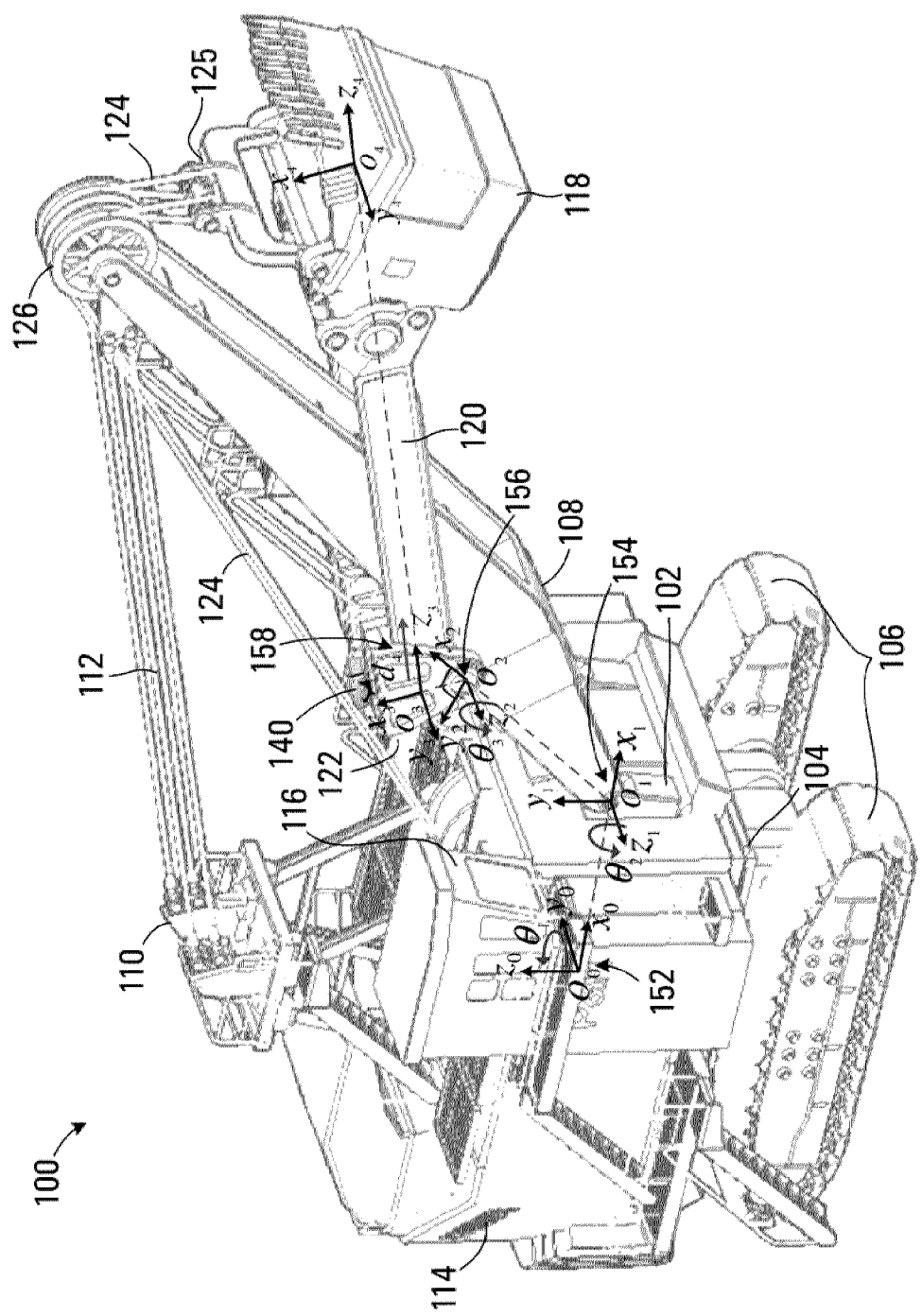
FIG. 1 is an elevational view of an electric mining shovel.

Referring to FIG. 1, an electric mining shovel is shown generally at 100. The mining shovel 100 includes a frame 102 pivotably mounted on a crawler platform 104. The crawler platform 104 includes crawler tracks 106 for moving the mining shovel 100 to a loading location. The mining shovel 100 also includes a boom 108, pivotably supported on frame 102, and an A-frame structure 110 attached to the frame 102. The boom 108 is supported by a boom suspension cable 112. During operation, the boom 108 is generally maintained at a fixed angle with respect to the frame 102. The crawler platform 104 is configured to permit the frame 102 and boom 108 to swing through an arc. Various motors and other equipment (not shown) for operating the mining shovel 100 are supported by the frame 102 within an equipment housing 114. The frame 102 further supports a cabin structure 116, which houses an operator of the mining shovel and various operating controls for use by the operator.

In this embodiment a dipper 118 is supported on a dipper handle 120. The dipper 118 acts as an operating implement for the mining shovel. The dipper 118 and dipper handle 120 are received in a support 122 commonly known as a saddle. The support 122 is pivotably coupled to the boom 108 and permits the dipper handle 120 to pivot within a vertical plane about the support. The mining shovel 100 also includes a crowd mechanism (not shown), which is coupled to the dipper handle 120 for linearly extending and retracting the dipper 118 with respect to the support 122. The crowd mechanism may be implemented using actuators such as hydraulic cylinders, cables, a rack and pinion drive, or other drive mechanism. The dipper 118 is suspended by a hoist cable 124 running over a sheave 126 disposed at the end of the boom 108. The hoist cable 124 attaches to a dipper adaptor 125 on the dipper 118 and is actuated by a winch drive motor (not shown) within the equipment housing 114. The hoist cable 124 and associated drive provides for vertical raising and lowering movement of the dipper 118 during loading operations.

Figure 2:
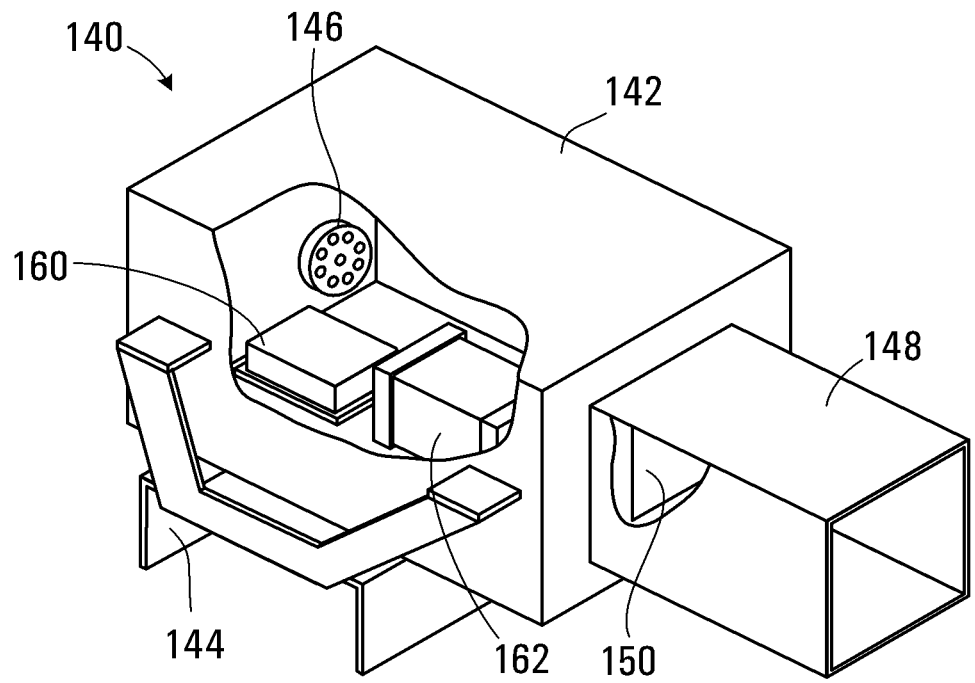
FIG. 2 is a partially cut away perspective view of a sensor apparatus used in the mining shovel shown in FIG. 1.

The mining shovel 100 includes a sensor apparatus 140 mounted on the support 122. The sensor apparatus 140 is operable to produce spatial positioning signals for determining a spatial positioning of the mining shovel 100. The sensor apparatus 140 is shown in greater detail in FIG. 2. Referring to FIG. 2, the sensor apparatus 140 includes a housing 142 and a mount 144 for mounting the housing on the support 122. The sensor apparatus 140 also includes an orientation sensor 160 and a displacement sensor 162 disposed within the housing 142. The sensors 160 and 162 are operably configured to produce spatial positioning signals including an orientation signal representing an orientation of the support 122, and a displacement signal representing a displacement of the dipper 118 relative to the support. The sensor apparatus 140 also includes a connector port 146 on the rear of the housing 142 for connecting signal lines for receiving the spatial positioning signals from the sensors 160 and 162 and for connecting operating power to the sensors. In other embodiments, the sensor apparatus 140 may include a wireless interface for transmitting the spatial positioning signals.

In the embodiment shown in FIG. 2, the orientation sensor 160 is a MEMS (microprocessor-electro-mechanical systems) orientation sensor such as the Xsens MTi manufactured by Xsens, An Enschede, The Netherlands. Other examples of suitable orientation sensors (also called 3DOT sensors) that may be used in this application are the 3DM-GX2 from MicroStrain Inc of Williston, Vt., USA, the InertiaCube 2+ from InterSense Incorporated of Billerica Mass., USA, and the Liberty electromagnetic tracker from Polhemous of Colchester, Vt., USA.

Figure 3:
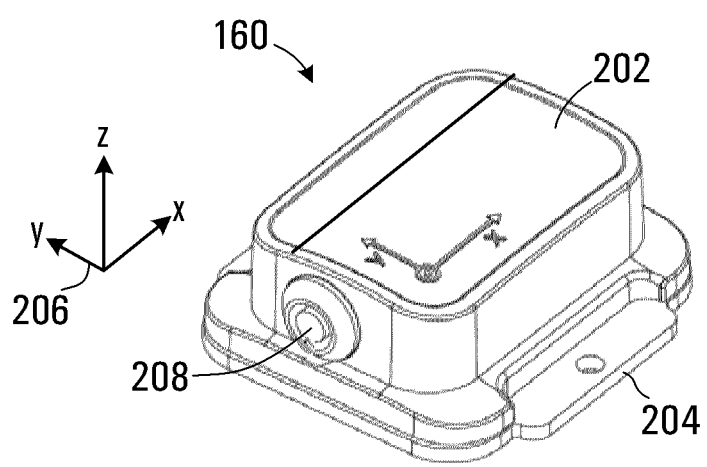
FIG. 3 is a perspective view of an orientation sensor used in the sensor apparatus shown in FIG. 2.

Referring to FIG. 3, the Xsens MTi sensor 160 includes a housing 202 and a mounting base 204 that defines a right handed Cartesian co-ordinate system 206 for the sensor. The housing 202 of the sensor 160 encloses a temperature sensor, three accelerometers respectively aligned to the X, Y, and Z axes 206 for measuring linear accelerations (sensitive to the earth's gravitational field), three magnetometers for measuring the earth's magnetic fields to determine a cardinal direction with respect to the earth's magnetic field, and three rate gyroscopes for measuring a rate of rotation about the X, Y, and Z axes.

The sensor 160 further includes signal conditioning amplifiers to condition signals produced by the various included sensors, analog to digital converters, and a dedicated digital signal processor (DSP), disposed within the housing 202. The DSP receives the various signals generated by the gyroscopes, magnetometers and accelerometers and uses a proprietary algorithm to process the signals, apply various corrections and calibration factors, and generate a 3D heading and attitude of the sensor 160. The static accuracy of the generated heading is considered to be less than 1° and the static accuracy of the attitude less than 0.5°. The DSP encodes the generated 3D attitude and heading into a data stream and produces a data signal output at a port 208. The produced data signal may be compliant with a data signalling protocol such as RS-323, RS-485, RS-422, or USB. Configuration commands may also be transmitted to the DSP via the port 208, using the data signalling protocol. Power for operating the DSP and the various sensor elements is also connected to the sensor 160 though the port 208. In the sensor apparatus 140 shown in FIG. 2, power and signal lines of the port 208 of the orientation sensor 160 are connected to the connector port 146 of the sensor apparatus 140. Advantageously, the orientation sensor 160 provides an accurate 3D heading and attitude of the housing 142 of the sensor apparatus 140 in any of a variety of signal formats. The orientation sensor 160 is also fully enclosed within the housing 202, which provides protection for sensor elements when operating in a harsh environment such as a mine. In other embodiments, the MEMS based orientation sensor may be substituted by other sensors that provide heading and attitude. For example, a biaxial accelerometer may be used to produce orientation signals representing the attitude of the support 122, and the signals may be filtered using a low pass filter to remove high frequency variations in the signal. A compass type sensor may be used to provide a heading signal.

In the embodiment shown in FIG. 2, the displacement sensor 162 comprises a laser rangefinder such as the Acuity AR4000 system manufactured by Schmitt Industries of Portland, Oreg., USA. Other examples of suitable rangefinder sensors that may be used in this application are the DT500 from Sick AG, Waldkirch, Germany, the LDM 42 from Jenoptik AG of Jena, Germany, the LLD sensor from Waycon Positionsmesstechnik, Taufkirchen, Germany, and the DLS-BH from Dimetix, of Herisau, Switzerland. The aforementioned rangefinder sensors are examples of non-contact laser rangefinders. It is however also possible to use other absolute linear displacement sensors such as a magnetostriction linear-position sensor for example. An example of a magnetostriction sensor is the Temposonic® linear position sensor, produced by MTS Systems Corporation of Cary, N.C., USA, which provides a dynamic reading of absolute displacement at an accuracy of 0.01".

Figure 4:
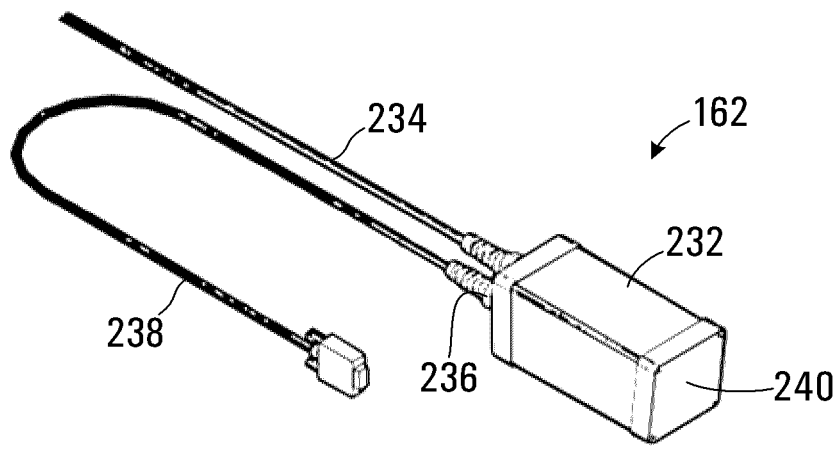
FIG. 4 is a perspective view of a displacement sensor used in the sensor apparatus shown in FIG. 2.

Referring to FIG. 4, the laser rangefinder displacement sensor 162 includes a sensor housing 232 having a data port 236 and data cable 238 for carrying data signals to and from the displacement sensor 162. The displacement sensor 162 receives electrical operating power via a power cable 234. The housing 232 also includes a window 240. A laser diode (not shown) is disposed to direct a collimated beam of light through the window 240 toward a target. In this embodiment the target is located on the dipper 118 and a surface finish of the dipper may provide for sufficient reflection to act as the target. In other embodiments a reflective element may be disposed on the dipper to provide an enhanced reflection, or alternatively the displacement sensor 162 may be disposed on the dipper handle 120 and configured to measure a distance between the sensor and the support 122. The laser diode may have a visible or infrared wavelength. Light reflected back from the target is collected by a Fresnel collection lens and directed to an avalanche detector located within the housing 232.

The displacement sensor 162 also includes a processor circuit (not shown) that implements a modified time-of-flight measurement principle for processing the return signal from the avalanche detector to generate a displacement signal. The displacement signal provides an absolute measurement of the displacement between the housing 232 and the target. The processor circuit encodes the displacement into a data stream and produces a data signal output at the data port 236, which may be compliant with a data signalling protocol such as RS-323, RS-485, or RS-422.

Referring back to FIG. 2, the housing 142 also includes a turret 148. The housing 142 further includes a window 150 that allows the light beam to be transmitted, while protecting the sensors 160 and 162 and interior of the housing from egress of water and contaminants. In one embodiment the window 150 comprises a lexan-sapphire window material. The turret 148 extends outwardly to protect the window from falling debris or dirt.

Advantageously, the orientation signal and displacement signal provide continuous real-time information during normal operation of the mining shovel 100, and it is not necessary to stop operating the dipper 118 to sense the disposition of the dipper or other operating implement. Furthermore there is no need to move the dipper 118 or dipper handle 120 to a reference spatial position to calibrate the sensors, since the orientation signal is referenced to the earth's magnetic and gravitational field.

Figure 5:
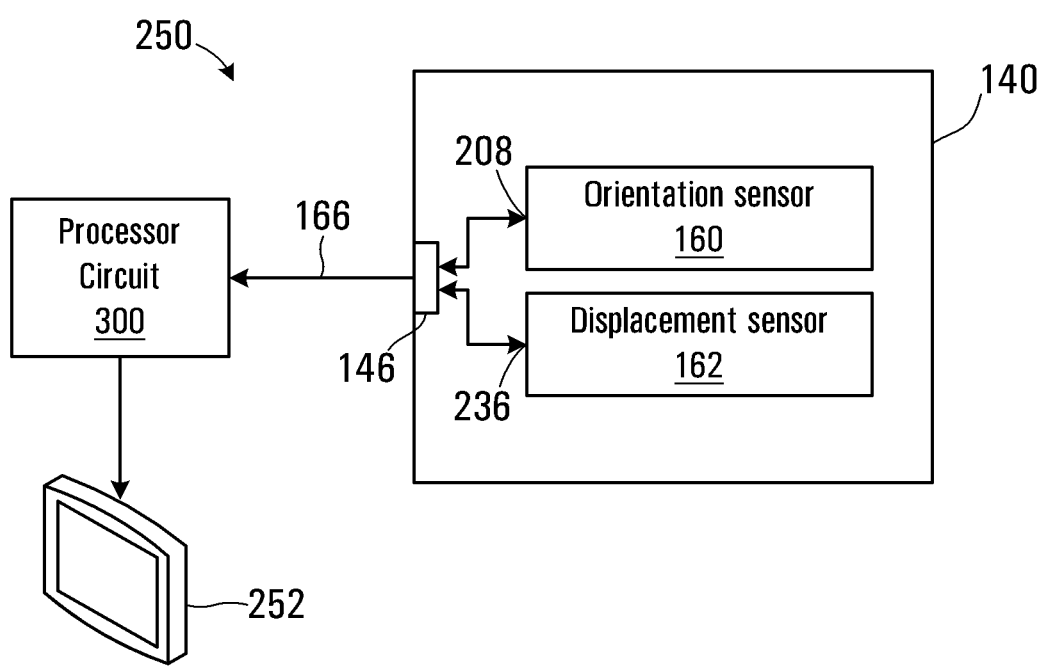
FIG. 5 is a block diagram of an apparatus for determining a spatial positioning of the electric mining shovel shown in FIG. 1.

Referring to FIG. 5, a block diagram of an apparatus for determining a spatial positioning of loading equipment, such as the electric mining shovel, is shown generally at 250. The apparatus 250 includes the sensor apparatus 140 shown in FIG. 2, and further includes a processor circuit 300. The processor circuit 300 is coupled by a cable 166 to the connector port 146 of the sensor apparatus 140 for receiving the orientation signal and the displacement signal. The processor circuit 300 is further configured to use a kinematic model of the loading equipment to compute an orientation and a position of the dipper 118 and dipper handle 120 of the electric mining shovel. The apparatus 250 further includes a display 252 in communication with the processor circuit 300, which is operably configured to produce an output signal representing the orientation and the position of the dipper 118 and dipper handle 120.

In a mining shovel embodiment, the processor circuit 300 would most likely be located in the cabin 116, and the cable 166 would be routed along the boom 108 to between the sensor apparatus 140 and the cabin. Advantageously, in the embodiment shown in FIG. 1, while the sensor apparatus 140 would necessarily be exposed to an environment surrounding the mining shovel 100, the processor circuit 300 is located within the cabin 116 (or in the equipment housing 114) thereby reducing the likelihood of damage.

The sensor apparatus 140 is mounted on the saddle block or support 122 with the X-axis 206 of the orientation sensor 160 aligned along the boom 108, such that the orientation signal received from the sensor apparatus 140 provides a heading of the boom with respect to the ground. The orientation signal received from the sensor apparatus 140 also provides the attitude (i.e. the pitch, roll, and yaw angles of the support 122 thereby providing the attitude of the dipper handle 120, which is coupled to the support.

The light beam produced by the displacement sensor 162 is reflected back to the sensor apparatus 140 from the dipper 118, and the displacement signal produced by the sensor apparatus thus provides the location of the dipper with respect to the sensor apparatus 140. In the electric shovel embodiment shown in FIG. 1, the boom 108 is generally maintained at a substantially fixed angle and the attitude and heading of the saddle support 122 and the extension of the dipper 118, along with geometric configuration details of the mining shovel components, provides sufficient information to facilitate computation of the spatial positioning of the dipper handle 120, boom 108, cabin 116, and frame 102, as detailed later herein. Alternatively, in other embodiments where the support is mounted on a boom that is not disposed at a fixed angle, or where it is desired to account for small angular movements due to compliance of the boom suspension cable 112, an additional orientation sensor may be disposed on the boom to determine the actual boom angle with respect to the cabin. The additional orientation sensor may be a single axis orientation sensor or a 3D orientation sensor such as the sensor 160.

Figure 6:
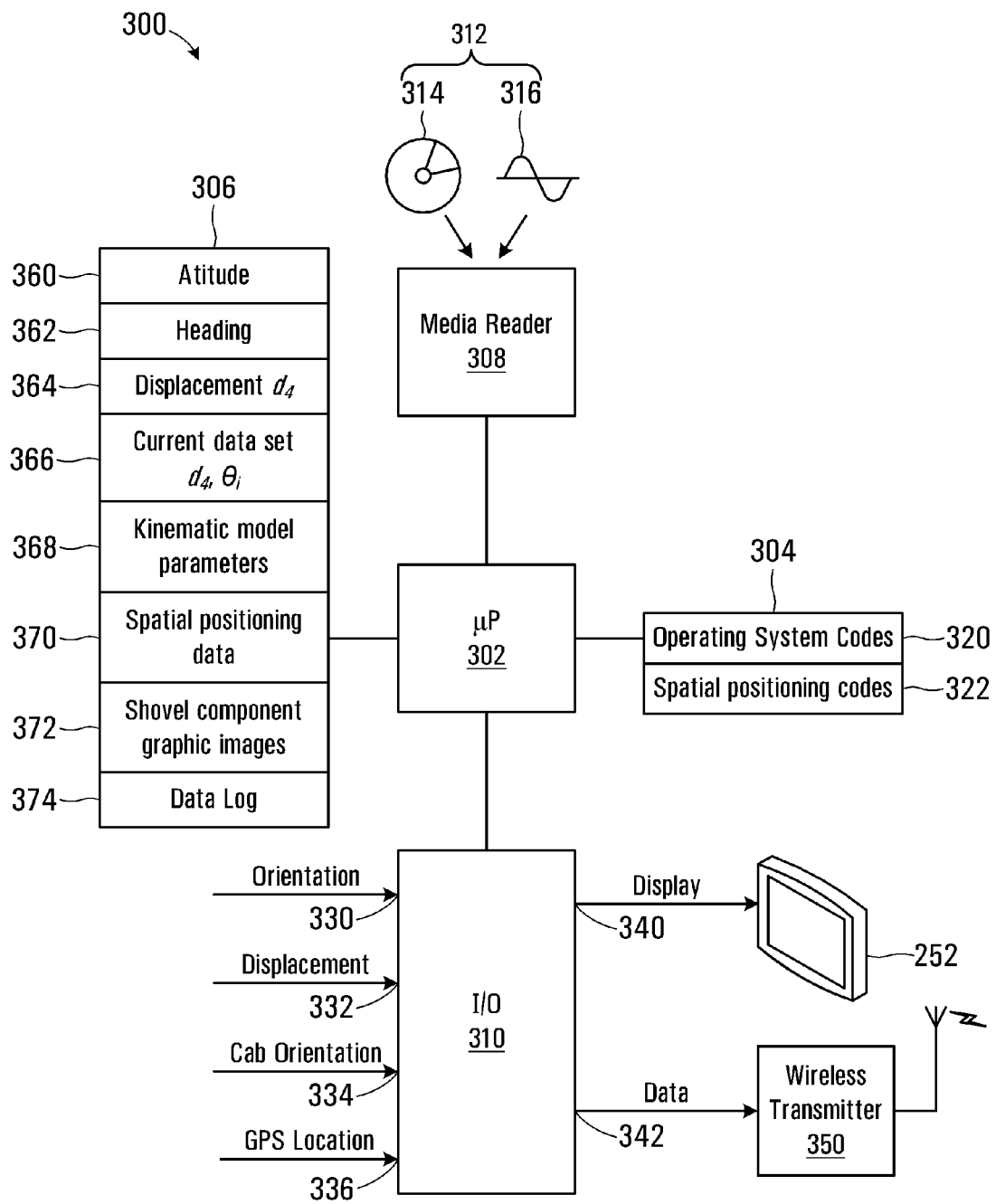
FIG. 6 is a schematic diagram a processor circuit shown in FIG. 5.

The processor circuit 300 is shown in greater detail in FIG. 6. Referring to FIG. 6, the processor circuit 300 includes a microprocessor 302, a program memory 304, a variable memory 306, a media reader 308, and an input output port (I/O) 310, all of which are in communication with the microprocessor 302.

Program codes for directing the microprocessor 302 to carry out various functions are stored in the program memory 304, which may be implemented as a compact flash memory or other memory such as a random access memory, hard disk drive, or a combination thereof. The program memory 304 includes a first block of program codes 320 for directing the microprocessor 302 to perform operating system functions. In one embodiment the program codes 320 may implement the Windows Embedded operating system, produced by Microsoft Corporation of Redmond, Wash., USA. The program memory 304 also includes a second block of program codes 322 for directing the microprocessor 302 to perform functions associated with determining the spatial positioning of the mining shovel 100.

The media reader 308 facilitates loading program codes into the program memory 304 from a computer readable medium 312, such as a CD ROM disk 314, or a computer readable signal 316, such as may be received over a network, for example.

The I/O 310 includes a first input 330 for receiving an orientation signal from the orientation sensor 160 and a second input 332 for receiving the displacement signal from the displacement sensor 162. The I/O 310 also includes a third input 334 for receiving a cab orientation signal and a fourth input 336 for receiving a GPS location signal. The cab orientation signal and GPS location signals are described later herein. The I/O 310 further includes a first output 340 for producing a display signal for controlling the display 252 and a second output 342 for producing a signal for controlling a wireless transmitter 350.

The variable memory 306 includes a plurality of storage locations including a memory store 360 for storing an attitude value, a memory store 362 for storing a heading value, a memory store 364 for storing a displacement value, a memory store 366 for storing current data set values, a memory store 368 for storing kinematic model parameter values, a memory store 370 for storing computed spatial positioning data values, a memory store 372 for storing graphic images of shovel components, and a memory store 374 for storing a historic data log. The variable memory 306 may be implemented in random access memory, for example.

Figure 7:
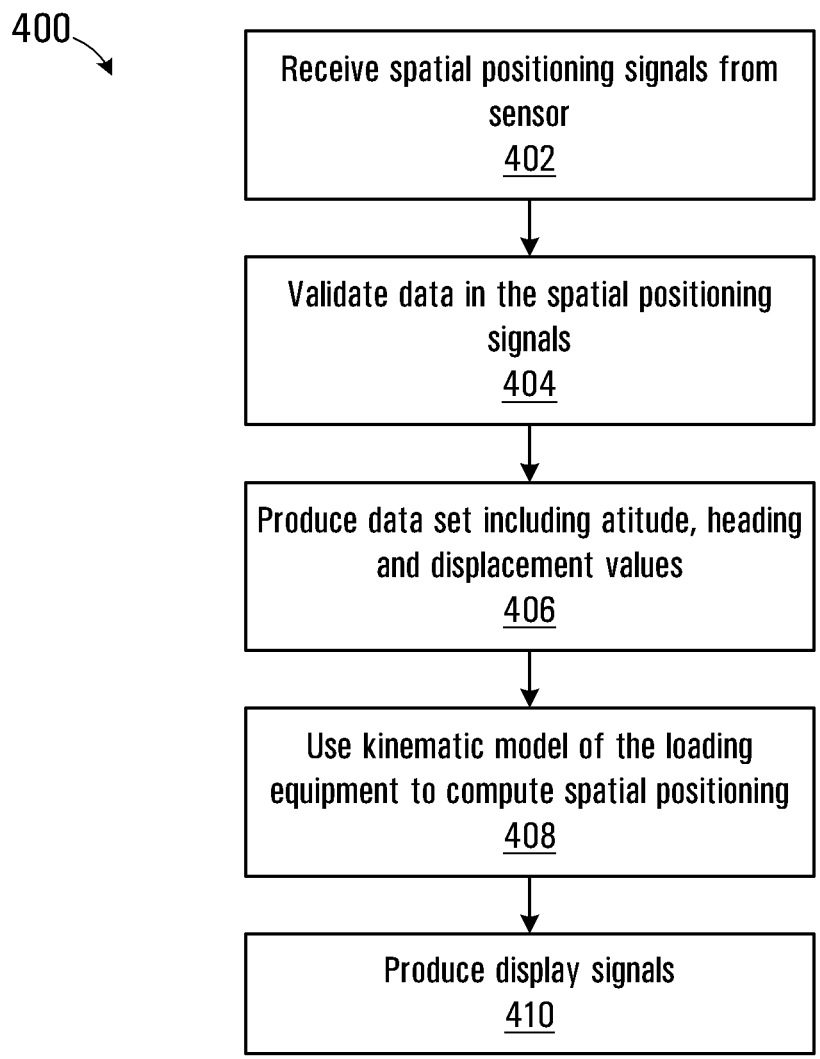
FIG. 7 is a flowchart depicting blocks of code for directing the processor circuit of FIG. 6 to carry out a process for determining the spatial positioning of the electric mining shovel shown in FIG. 1.

Referring to FIG. 7, a flowchart depicting blocks of code for directing the processor circuit 300 to determine the spatial positioning of the mining shovel 100 is shown generally at 400. The blocks generally represent codes that may be read from the computer readable medium 312, and stored as program codes 322 in the program memory 304, for directing the microprocessor 302 to perform various functions related to determining spatial positioning. The actual code to implement each block may be written in any suitable program language, such as C, C++ and/or assembly code, for example.

The process begins at block 402, which directs the microprocessor 302 to receive the spatial positioning signals from the sensor, including the orientation signal and the displacement signal. In one embodiment the spatial positioning signals are received from the orientation sensor 160 and displacement sensor 162 at a regular update interval and, block 402 directs the microprocessor 302 to decode the orientation signal to generate attitude and heading values and to store the values in the respective memory stores 360 and 362 of the variable memory 306 (shown in FIG. 6). In this embodiment, the orientation sensor 160 uses the magnetometers to determine a magnetic north direction with respect to the earth's magnetic field. The internal DSP in the orientation sensor 160 also determines the pitch, roll, and yaw of the mounting base 204 of the sensor 160. The Yaw angle, expressed relative to magnetic north, provides a compass heading of the sensor and thus the saddle support 122 and dipper handle 120. This yaw angle is saved as the heading (i.e. $\theta_1$) in the heading memory store 362. The pitch angle generated by orientation sensor 160 provides the attitude of the mounting base 204 of the sensor 160, and thus the attitude of the support 122 and dipper arm 120. The pitch angle is saved in the attitude memory store 360.

Block 402 also directs the microprocessor 302 to decode the displacement signal to generate a displacement value d and to store the displacement value in the memory store 364 of the variable memory 306.

Block 404 then directs the microprocessor 302 to process and validate the values stored in the memory stores 360-364. For example, the values may be compared to criteria such as maximum and minimum values expected based on the geometry of the mining shovel 100 and values that do not meet the criteria, or values that result from a false sensor reading, for example, will be discarded.

The process 400 then continues at block 406, which directs the microprocessor 302 to retrieve current values of attitude, heading, and displacement from the memory stores 360-364 and to store the values as a data set in the memory store 366 of the variable memory 306. The memory stores 360-364 thus act as containers for receiving values streamed from the sensors 160 and 162, while the memory store 366 is used to store a validated set of values representing the orientation of the support 122 and the displacement of the dipper 118 at a particular time.

Block 408 then directs the microprocessor 302 to read parameters associated with a kinematic model of the mining shovel 100 from the memory store 368 of the variable memory 306 and to compute the spatial positioning of the loading equipment using the kinematic model. The process 400 then continues at block 410, which directs the microprocessor 302 to produce an output signal representing the computed spatial positioning.

Figure 8:
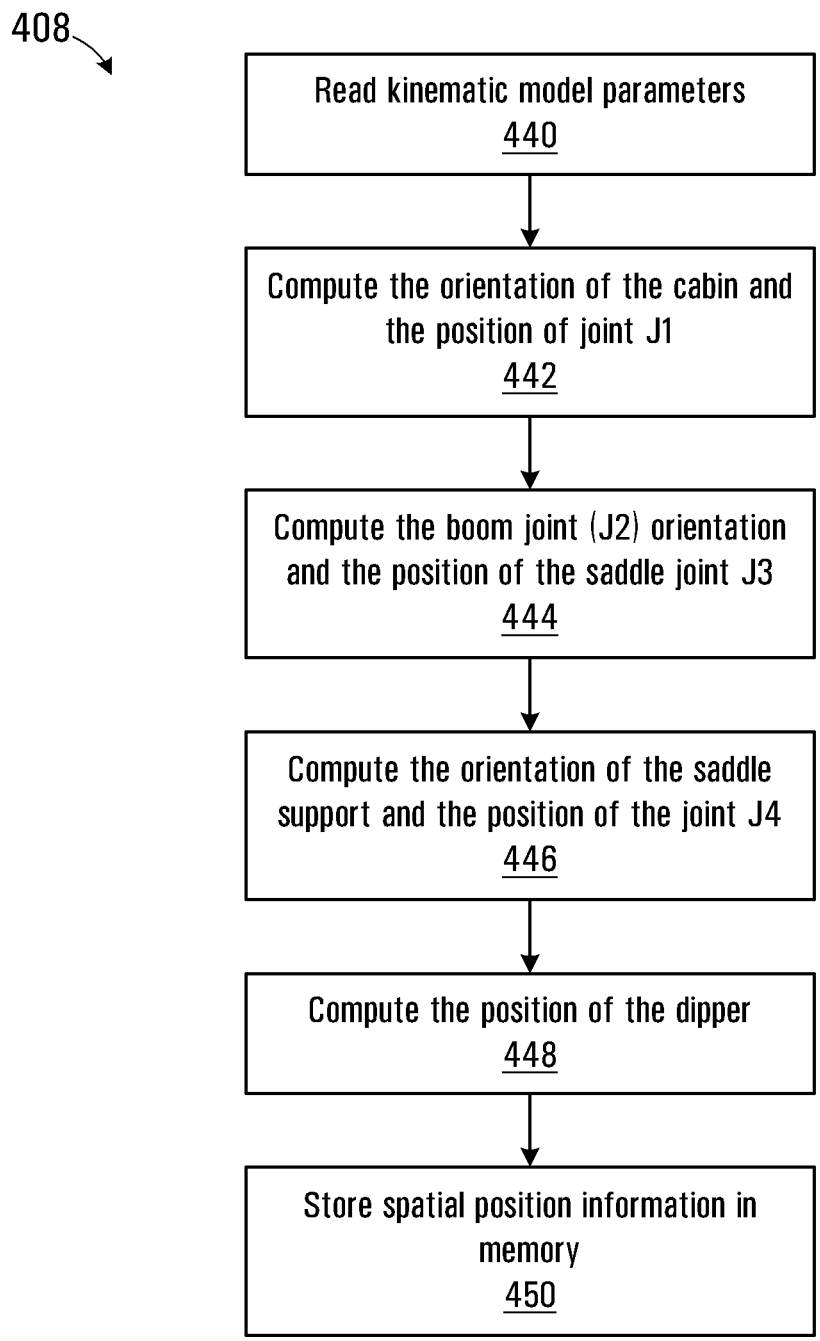
FIG. 8 is a flowchart depicting blocks of code for directing the processor circuit of FIG. 6 to carry out a portion of the process shown in FIG. 7.

The process of block 408 shown in FIG. 7 for computing the spatial positioning of the electric mining shovel 100 is shown in greater detail at 408 in FIG. 8. Referring to FIG. 8, the process 408 begins at block 440, which directs the microprocessor 302 to read the kinematic model parameters from the memory store 368 of the variable memory 306 (shown in FIG. 6).

In one embodiment, the mining shovel 100 may be modeled using the Denavit-Hartenberg method, which provides a convention for selecting frames of reference in robotics applications. Referring back to FIG. 1, the mining shovel 100 may be treated as a 4 degree of freedom (DOF) manipulator having three revolute joints and one prismatic joint. The three revolute joints include a joint 152 between the crawler platform 104 and the cabin that permits the cabin to swing about the crawler platform (angle $\theta_1$), a joint 154 between the frame 102 and the boom 108 (i.e. angle $\theta_2$), and a joint 156 between the saddle support 122 and the boom (i.e. angle $\theta_3$) that allows the saddle to pivot to accommodate raising or lowering of the dipper 118. In this embodiment the boom joint angle $\theta_2$ is taken into account as a fixed angle. In other embodiments, the boom joint angle may be taken into consideration as a variable angle, since in operation the boom 108 may undergo small angular displacement about the boom joint 154 due to the compliance of the suspension cable, particularly when the dipper 118 is fully loaded. Furthermore, in some circumstances the boom 108 may pivot upwardly when the dipper 118 engages the mine face and the dipper and dipper handle 120 continue to move away from the boom. When the dipper 118 is subsequently retracted by the operator, the boom may come down with an impact against the boom suspension cable 112. This condition is referred to as boom jacking, and may be accounted for by inclusion of a further boom angle sensor as described earlier herein.

The prismatic joint comprises a joint 158 between the dipper handle 120 and the saddle support 122 and takes into account an extension d of the dipper handle with respect to the support 122 due to operation of the crowd mechanism.

Figures 9, 10:
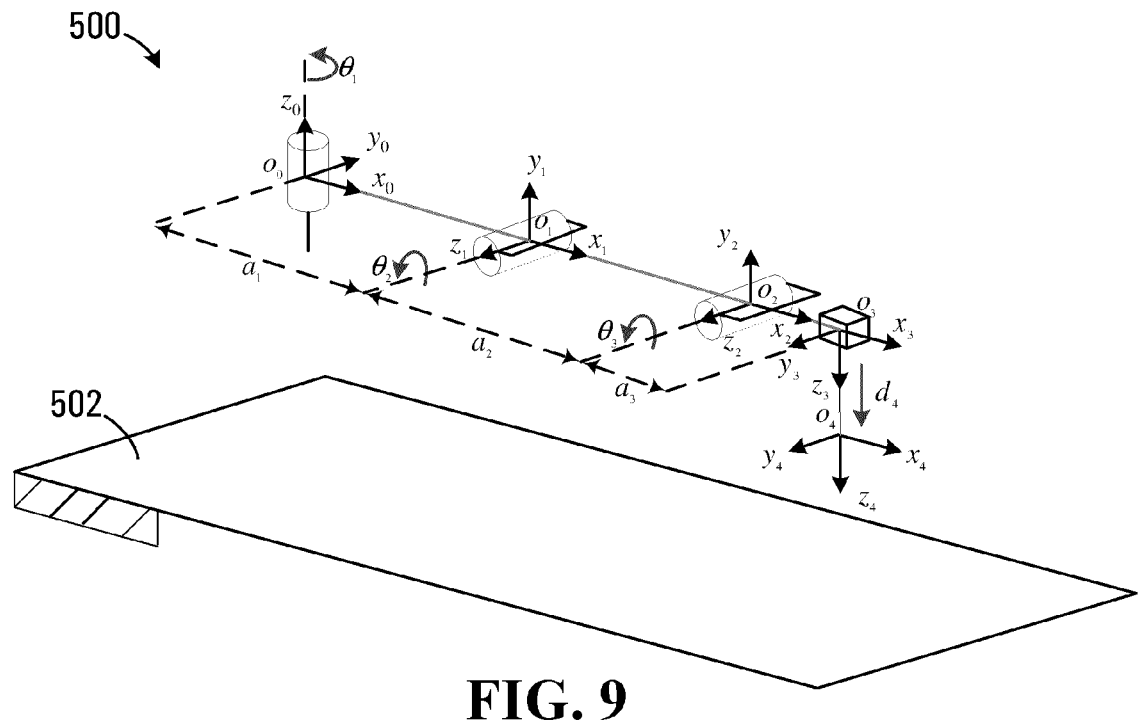
FIG. 9 is a simplified model of the mining shovel shown in FIG. 1.
FIG. 10 is a table of kinematic parameters of the mining shovel.

The mining shovel 100 shown in FIG. 1 may be represented by a simplified model shown in FIG. 9 at 500 where the ground is represented by a plane 502 and where the joints 152-158 are respectively defined by respective xyz Cartesian coordinate frames $o_0$, $o_1$, $o_2$ and $o_3$. The operating implement (in this case the dipper 118) is represented by a frame $o_4$ in FIG. 9. The Denavit-Hartenberg parameters of the mining shovel 100 are shown in tabular form in FIG. 10 at 520, where $\theta_1$-$\theta_3$ and $d_4$ are the joint angular and linear displacements as discussed above, $a_1$ is the link length between $o_0$ and $o_1$, $a_2$ is the link length between $o_1$ and $o_2$, and $a_3$ is the link length between $o_2$ and $o_3$. The angles $\alpha_1$-$\alpha_4$ are angular offsets of the respective z-axes ($z_0$-$z_4$) in moving between the respective coordinate frames at the joints $o_0$-$o_3$ and frame $o_4$.

The boom 108 is included as a link in the simplified model 500, and its connection to the frame 102 is defined as a passive joint $o_1$, since in this embodiment the boom joint is considered fixed.

The parameters in the table of FIG. 10 are stored in the memory store 368 of the variable memory 306. As noted above, block 440 directs the microprocessor 302 to read the parameters from the memory store 368.

The process then continues at block 442, which directs the microprocessor 302 to compute the orientation of the cabin 116 (i.e. $\theta_1$) and the resulting position of the boom joint 154. Since the boom 108 is aligned with the cabin 116, block 442 directs the microprocessor 302 to read the yaw angle value stored in the memory store 366 of the variable memory 306, which is used as the angle $\theta_1$. The boom joint ($o_1$) position with respect to the joint 152 ($o_0$) is then determined from the angle $\theta_1$ and the link length $a_2$. In this embodiment it is assumed that the cabin 116 and frame 102 are horizontally oriented with respect to the ground, but in other embodiments the cabin pitch and roll orientations may be provided by a 3-axis accelerometer, such as the CXL-GP accelerometer produced by Crossbow Technology, Inc. of San Jose, Calif., USA, or by a roll/pitch sensor provided by the same company, or an Xsens MTi sensor, as described above. When provided, such a sensor provides an orientation of the frame 102, which, since the boom 118 is attached to the frame, will have some influence on the spatial positioning of the shovel when the cabin is not horizontally oriented.

Block 444 then directs the microprocessor 302 to read the boom joint angle $\theta_2$, which in the embodiments above is considered to be fixed, but may be sensed by a high resolution joint angle sensor, as described above. Block 444 further directs the microprocessor 302 to compute the position of the joint 156 ($o_2$) using the angle $\theta_2$ and the link length $a_2$.

Block 446 then directs the microprocessor to compute the position and orientation of the joint 158 ($o_3$) of the saddle support 122. Block 446 directs the microprocessor 302 to read the pitch angle of the saddle support 122 from the memory store 366 of the variable memory 306, which provides the angle $\theta_3$. Block 446 further directs the microprocessor 302 to compute the position of the joint $o_3$ from the angle $\theta_3$ and the link length $a_3$. The orientation of the prismatic joint $o_3$ provides the orientation of the dipper handle 120, which in this embodiment is assumed to be rigidly coupled for substantially linear extension and retraction with respect to the support.

The process then continues at block 448, which directs the microprocessor 302 to read the measured displacement $d_4$ from the memory store 366 of the variable memory 306 and to compute the resulting position of the dipper 118 (i.e. the frame $o_4$) using the angle $\theta_3$ and the displacement $d_4$.

In another embodiment, the Denavit-Hartenberg model parameters may be used to generate a transform matrix, which may be used to simultaneously execute the blocks 442-448 shown in FIG. 8.

Considering the mining shovel 100 represented in FIG. 1 as a series of links, with a frame rigidly attached to each link, the location and orientation of the bucket or the end-effecter (frame $o_4$) may be expressed with respect to the base frame $o_0$ as:

$$T_{04} = A_{01}(\theta_1) A_{12}(\theta_2) A_{23}(\theta_3) A_{34}(d_4) \qquad \text{Eqn 1}$$

The transformation matrix $T_{O4}$ is a transformation matrix from the dipper 118 to the crawler platform 104, where:

$$A_{01} = \begin{bmatrix} c_1 & 0 & s_1 & a_1 c_1 \\ s_1 & 0 & -c_1 & a_1 s_1 \\ 0 & 1 & 0 & 0 \\ 0 & 0 & 0 & 1 \end{bmatrix} \quad A_{12} = \begin{bmatrix} c_2 & -s_2 & 0 & a_2 c_2 \\ s_2 & c_2 & 0 & a_2 s_2 \\ 0 & 0 & 1 & 0 \\ 0 & 0 & 0 & 1 \end{bmatrix}$$

$$A_{23} = \begin{bmatrix} c_3 & 0 & s_3 & a_3 c_3 \\ s_3 & 0 & -c_3 & a_3 s_3 \\ 0 & 1 & 0 & 0 \\ 0 & 0 & 0 & 1 \end{bmatrix} \quad A_{34} = \begin{bmatrix} 1 & 0 & 0 & 0 \\ 0 & 1 & 0 & 0 \\ 0 & 0 & 1 & d_4 \\ 0 & 0 & 0 & 1 \end{bmatrix}$$

and where:

$o_0$, $x_0$, $y_0$, $z_0$ coordinate frame of the swing revolute joint
$o_2$, $x_2$, $y_2$, $z_2$ coordinate frame of the boom revolute joint
$o_3$, $x_3$, $y_3$, $z_3$ coordinate frame of the saddle block revolute joint
$o_4$, $x_4$, $y_4$, $z_4$ coordinate frame of the operating implement
$a_1$ perpendicular distance from $z_0$ to $z_1$ (the length of link 1)
$a_2$ perpendicular distance from $z_1$ to $z_2$ (the length of link 2)
$a_3$ perpendicular distance from $z_2$ to $z_3$ (the length of link 3)
$s_i \sin \theta_i$ (i=1, 2, 3)
$c_i \cos \theta_i$ (i=1, 2, 3)
$s_{23} \sin(\theta_2 + \theta_3)$
$c_{23} \cos(\theta_2 + \theta_3)$
$\theta_1$ angular displacement of the swing joint
$\theta_2$ angular displacement of the boom joint
$\theta_3$ angular displacement of the saddle block joint
$d_4$ linear displacement of the crowd joint which corresponds to the linear movement of the dipper handle relative to the saddle block or the distance from the saddle block to the center of the dipper
$A_{i-1,i}$ coordinate transformation matrix from frame $o_i$ to frame $o_{i-1}$
$T_{o4}$ coordinate transformation from the operating implement (i.e. dipper 118) frame to the base frame.

$$T_{04} = \begin{bmatrix} c_1 c_{23} & s_1 & c_1 s_{23} & c_1 s_{23} d_4 + c_1 c_{23} a_3 + c_1 c_2 a_2 + c_1 a_1 \\ s_1 c_{23} & -c_1 & s_1 s_{23} & s_1 s_{23} d_4 + s_1 c_{23} a_3 + s_1 c_2 a_2 + s_1 a_1 \\ s_{23} & 0 & -c_{23} & -c_{23} d_4 + s_{23} a_3 + a_2 s_2 \\ 0 & 0 & 0 & 1 \end{bmatrix} \qquad \text{Eqn 2}$$

In other embodiments the process 440 shown in FIG. 8 may include further steps for computing the orientation and position of the hoist cable 124. Block 450 directs the microprocessor 302 to compute the position of the sheave 126, which is provided by the boom angle $\theta_2$ and a known spacing between the joint $o_1$ and the sheave. The computed position of the dipper 118 also facilitates determination of the dipper adaptor 125, thus allowing computation of the orientation of the hoist cable 124.

The process 440 then continues at block 450, which directs the microprocessor 301 to store the computed data defining the spatial positioning of the components of the mining shovel 100 in the memory store 370 of the variable memory 306.

Figure 11:
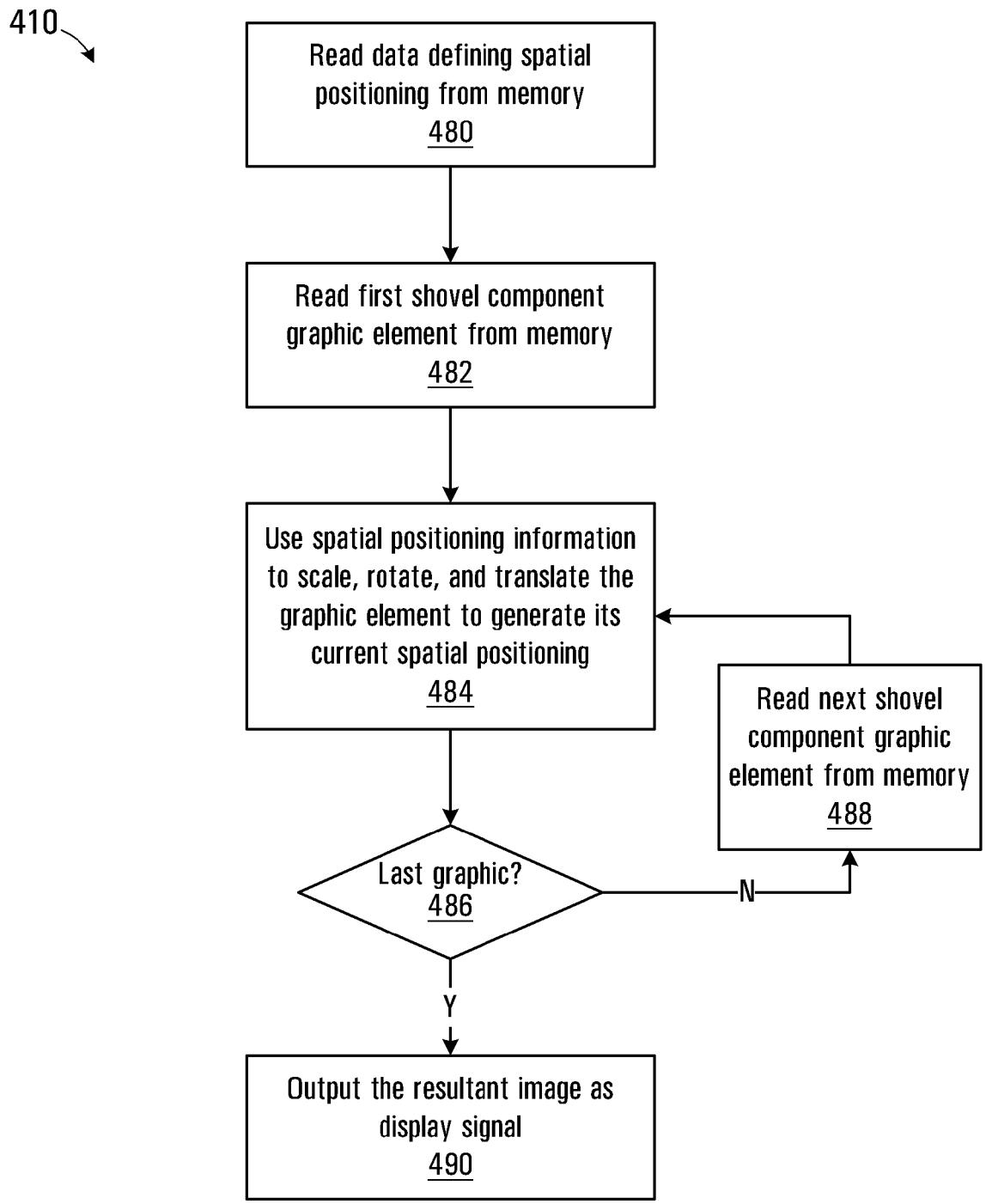
FIG. 11 is a flowchart depicting blocks of code for directing the processor circuit of FIG. 6 to carry out a further portion of the process shown in FIG. 7.

The process of block 410 shown in FIG. 7 for producing display signals for displaying a representation of the electric mining shovel 100 is shown in greater detail in FIG. 11. An exemplary representation of the mining shovel 100 produced by the processor circuit 300 on the display 252 is shown at 550 in FIG. 12. Referring to FIG. 11, the process 410 begins at block 480, which directs the microprocessor 302 to read the computed data defining the spatial positioning of the components of the mining shovel 100 from the memory store 370. Block 482 then directs the microprocessor 302 to read graphic images of a first shovel component from the variable memory 306. Each major component of the mining shovel such as crawler platform 104, frame 102 and cabin 116, boom 108, saddle support 122, dipper handle 120 and dipper 118 may have an associated graphic image that may be used to generate a representation of the mining shovel 100 in the correct spatial positioning.

Figure 12:
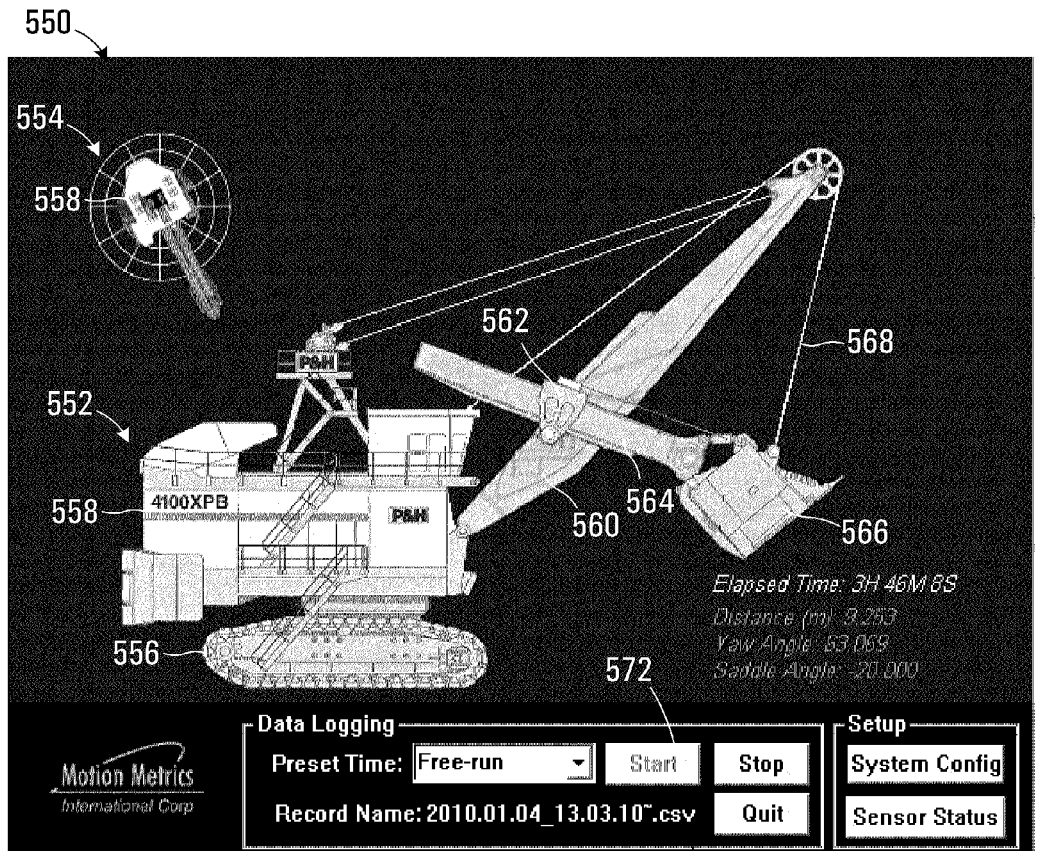
FIG. 12 is a screenshot of an exemplary mining shovel representation produced by the processor circuit of FIG. 7.

Block 484 then directs the microprocessor 302 to position the first graphic image in space. In this embodiment the crawler platform 104 is used as a reference and thus does not require any change of spatial positioning and is displayed as shown in FIG. 12. Referring to FIG. 12, the representation 550 includes an elevational view 552 of the mining shovel 100 and a plan view 554 of the shovel. In the embodiment shown, the orientation of the crawler tracks is not computed and a crawler platform representation 556 is shown in a default horizontal orientation.

Referring back to FIG. 11, the process then continues at block 486, which directs the microprocessor 302 to determine whether further graphic images remain to be displayed, in which case the process continues at block 488. Block 488 directs the microprocessor 302 to read the next graphic image from the memory 372. Block 488 then directs the microprocessor 302 to repeat blocks 484 and 486 for the next graphic image, which in this embodiment would be the frame and the cabin of the mining shovel 100. Referring to FIG. 12, the cabin and frame are shown at 558, and the image representation is rotated in the plan view 554 to show the heading of the cabin relative to the crawler platform, which is not clearly visible in the plan view representation 554.

Blocks 484 and 486 are then repeated for the remaining graphic images of the boom 560, saddle support 562, dipper handle 564, dipper 566, and hoist cable 568, as shown in FIG. 12. If at block 486, it is determined that the last graphic images has been processed, block 486 directs the microprocessor 302 to block 490. Block 490 directs the microprocessor 302 to cause the I/O 310 (shown in FIG. 6) to output a display signal at the first output 340 for displaying the resultant mining shovel representation image 550 on the display 252. Advantageously, the representation in FIG. 12 provides an operator of the mining shovel 100 with a real time display of the spatial positioning of the various components of the shovel that forms useful feedback for operations.

The representation 550 also provides a data logging control panel 570 that facilitates input by the operator to start logging shovel data. When a start button 572 is activated by the operator (for example by touching a touch sensitive area of the display 252), the spatial positioning data in the memory store 370 is copied to the data log memory store 374 in the variable memory 306. The memory store 370 thus accumulates subsequent updated spatial positioning data associated with operation of the mining shovel 100, thus providing a historic record of shovel operations over time. The historic record may be used to analyze performance of the mining shovel and/or operator. For example, loading operations that result in excessive cabin swing about the crawler platform to a particular side may result in preferential wear to components and may be discerned by examining swing angle data in the historic record. Analysis may also be performed to determine other performance indicators such as non-digging time, or a cyclic activity parameter associated with operation of the loading equipment, for example. Advantageously, the historic record may provide a useful indication of mining shovel performance and performance of specific operators assigned to operate the shovel.

In a further embodiment, the microprocessor 302 may be further configured to cause the I/O 310 to output a data signal encoding the data set values stored in the memory store 366 or the historic data 374 at the second output 342 for transmission to a remote location by the wireless transmitter 350. In one embodiment, the remote location may be a dispatch center associated with mine operations, and the transmission may be used to provide data for monitoring operations of the mining shovel 100.

In the embodiments described above, while spatial positioning is determined with respect to magnetic north, the exact location of the mining shovel 100 is not available. Referring back to FIG. 6, in an alternative embodiment, the mining shovel 100 may be equipped with GPS receiver, and a GPS location signal may be received at the fourth input 336 of the I/O 310. The GPS location signal provides a real time absolute location of the mining shovel frame $o_0$ (shown in FIG. 9), and may be used by the microprocessor 302 to compute respective absolute locations of the shovel components, such as the dipper 118. For loading equipment that does not have a GPS receiver, the orientation sensor 160 may be replaced by a sensor that has an integrated GPS receiver and provides GPS location in addition to the attitude and heading. Advantageously, accurately sensing an absolute location of an operating implement (such as the dipper 118) by combining GPS sensor signals and spatial positioning information provided by the apparatus 250 is particularly useful in mining of minerals such as precious metals (for example gold and platinum). Knowledge of a precise digging location may be correlated with the geological map of the mine to determine a percentage yield of ore being loaded by the dipper 118, thus facilitating efficient mining of ore from the mine.

Advantageously, the apparatus 250 disclosed above determines a real-time spatial positioning of the dipper 118 with respect to the crawler platform 104 of the mining shovel 100. The determined spatial position of the dipper 118 may be used by other systems for monitoring operations of the mining shovel 100. For example, Motion Metrics International Corp of Vancouver, BC, Canada provides the ToothMetrics™ and WearMetrics™ systems for monitoring a condition of the dipper teeth that engage the mine face during digging operations and are prone to wear and damage, as well as the FragMetrics™ system that provides information of the condition of the payload. These systems operate on the basis of views of the dipper captured by camera. Accordingly, prior knowledge of the spatial positioning or posture of the dipper handle 120 and dipper 118 reduces image processing required to locate the dipper and determine the spatial positioning of the dipper in the image. The spatial positioning information provided by the apparatus 250 may be used to confirm the orientation of the dipper handle 120 and dipper 118 and/or to reduce the processing necessary to locate these components in the captured images.

While the embodiments have been described in connection with the mining shovel 100 shown in FIG. 1, the sensor apparatus 140 and processor circuit 300 may be implemented on other loading equipment such as various types of cranes, mining shovels, and other heavy machinery where collective movement of specific components is necessary for the safe and efficient operation of the machinery. Accordingly, various aspects of the invention may be implemented in equipment used in quarries, construction, and oil industries, for example.

Figure 13:
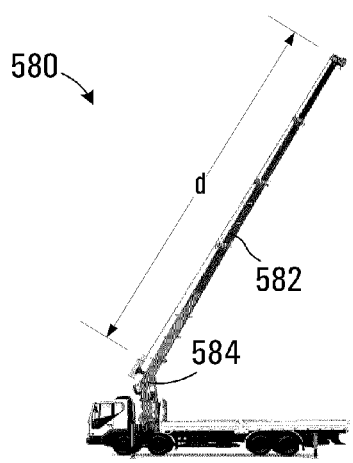
FIG. 13 is an elevational view of a telescopic crane embodiment of the invention.

An example of a telescopic crane is shown in FIG. 13 at 580. The crane 580 includes a telescopic boom 582 that is configured to pivot about a support 584. A sensor apparatus, such as the sensor apparatus 140 shown in FIG. 2 may be mounted on the boom 582 of the crane 580 to provide both an orientation of the boom and a distance d to the end of the boom, which corresponds to the extended length of the boom. A display in an operating cabin of the crane 580 may be configured to display a representation of the crane in a similar manner to that described above in connection with the representation shown in FIG. 12 at 550.

Figure 14:
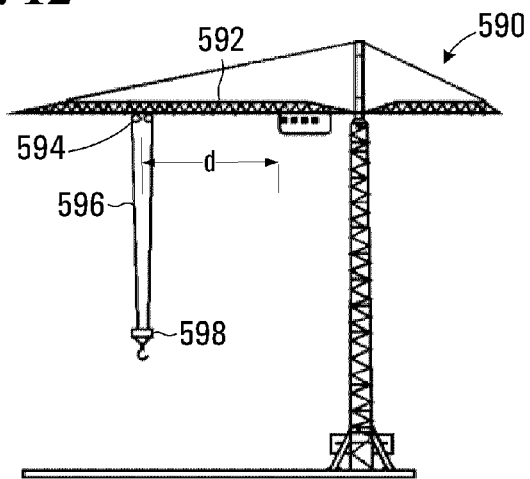
FIG. 14 is an elevational view of a tower crane embodiment of the invention.

An example of a tower crane is shown in FIG. 14 at 590. The crane 590 includes a boom or horizontal jib 592 and a trolley 594 configured to travel along the jib. The trolley includes a sheave for guiding a lifting cable 596 that supports a hook block 598. A sensor apparatus may be mounted on the jib 592 to provide both an orientation of the jib and a distance d to the trolley 594. As in the telescopic crane example above, a display in an operating cabin of the crane 590 may be configured to display a representation of the crane 590.

Advantageously, the above embodiments provide absolute orientation information associated with working components of the loading apparatus on which the sensor apparatus is installed. Furthermore, orientation information is provided by sensors housed in a common housing, such as the housing 142 shown in FIG. 2, thus simplifying mounting and installation of the sensor apparatus.

While specific embodiments of the invention have been described and illustrated, such embodiments should be considered illustrative of the invention only and not as limiting the invention as construed in accordance with the accompanying claims.

What is claimed is:

1. An apparatus for determining a spatial positioning of loading equipment, the loading equipment having an operating implement for loading a payload, the operating implement being coupled to a support for movement relative to the support, the apparatus comprising:
    an orientation sensor disposed on the support and being operable to produce an orientation signal representing an orientation of the support; and
    a displacement sensor operable to produce a displacement signal representing a displacement of the operating implement relative to the support;
    a processor circuit operably configured to:
        receive said orientation signal and said displacement signal;
        use a kinematic model of the loading equipment to compute a spatial positioning of the loading equipment; and
        produce an output signal representing said spatial positioning.

2. The apparatus of claim 1 wherein said orientation sensor and said displacement sensor are operable to produce updated orientation and displacement signals during movement of the operating implement and wherein said processor circuit is operably configured to receive the updated signals and produce an output signal representing a dynamically updated spatial positioning of the loading equipment.

3. The apparatus of claim 1 wherein said displacement sensor is disposed on the support.

4. The apparatus of claim 3 wherein said orientation and said displacement sensors are each disposed within a sensor housing mounted on the support.

5. The apparatus of claim 1 wherein said displacement sensor is disposed on the operating implement.

6. The apparatus of claim 1 wherein said orientation signal comprises information indicating at least:
    a cardinal heading of the support; and
    a pitch angle of the support.

7. The apparatus of claim 6 wherein said orientation signal further comprises a roll angle of the support.

8. The apparatus of claim 1 further comprising:
    an interface in communication with said processor circuit and being operably configured to receive coordinates defining a location of the loading equipment with respect to an earth coordinate system; and
    wherein said processor circuit is operably configured to use the coordinates and the computed spatial positioning to compute a location of the operating implement with respect to the earth coordinate system.

9. The apparatus of claim 8 wherein the loading equipment comprises a mining shovel and wherein said processor circuit is operably configured to correlate the computed location of the operating implement with map data representing a yield expected from ore at the location of the operating implement to provide a yield estimate for the ore loaded in the operating implement.

10. The apparatus of claim 8 wherein said interface is operably configured to receive GPS coordinates defining said location of the loading equipment.

11. The apparatus of claim 1 wherein said orientation sensor comprises a plurality of sensor elements coupled to a microprocessor circuit, said microprocessor circuit being operably configured to produce said orientation signal in response to receiving signals from said plurality of sensor elements.

12. The apparatus of claim 1 wherein said displacement sensor comprises a laser rangefinder sensor, said laser rangefinder sensor being operable to direct a laser beam at a target located proximate the operating implement to determine said displacement of the operating implement relative to the support.

13. The apparatus of claim 1 wherein said processor circuit is operably configured to produce said output signal by producing a display signal operable to cause a representation of the loading equipment to be displayed on a display for communicating said spatial positioning to an operator of the loading equipment.

14. The apparatus of claim 13 wherein said processor circuit is operably configured to produce said display signal by producing a display signal operable to cause display of at least one of:
    an elevational representation of the loading equipment indicating said spatial positioning of the loading implement with respect to the loading equipment; and
    a plan representation of the loading equipment indicating a heading of the operating implement.

15. The apparatus of claim 1 further comprising a transmitter operably configured to transmit said output signal to a remote location to facilitate remote monitoring of loading equipment operations.

16. The apparatus of claim 15 wherein said transmitter comprises a wireless transmitter.

17. The apparatus of claim 1 wherein the loading equipment comprises a mining shovel having a boom extending outwardly from a frame, and wherein:
    said support is pivotably coupled to said boom;
    the operating implement comprises dipper handle having first and second ends, the first end being coupled to a dipper for loading ore from a mine face, the second end being received in said support and being coupled to a drive operable to cause linear reciprocating motion of the dipper handle and dipper with respect to the support; and
    wherein said displacement sensor is operably configured to receive a displacement signal representing a generally linear displacement between said support and said dipper.

18. The apparatus of claim 17 further comprising a sensor, disposed on said frame and wherein said processor circuit is operably configured to:
    receive a signal representing a pitch angle of the frame and a roll angle of the frame; and
    use said pitch and roll angles of the frame to compute an orientation of the frame prior to computing said spatial positioning of the loading equipment.

19. The apparatus of claim 18 wherein said processor circuit is operably configured to generate a kinematic model of the mining shovel wherein:

a coupling between a crawler platform and said frame is modeled as a first revolute joint;
a coupling between said frame and said boom is modeled as a second revolute joint;
a coupling between said boom and said support is modeled as a third revolute joint; and
a coupling between said dipper handle and said support is modeled as a prismatic joint.

20. The apparatus of claim 19 wherein the dipper is pivotably coupled to the first end of the dipper handle and comprises an adaptor for coupling to a hoist cable, the hoist cable extending over a point sheave disposed at a distal end of the boom, the hoist cable being operable to move the dipper about the first end of the dipper handle and to move the dipper and dipper handle about the support during loading operations, and wherein said processor circuit is operably configured to:
compute an orientation and position of the adaptor based on a dipper tip and point sheave locations;
compute a length of the hoist cable between the adaptor and the point sheave;
compute a rotation of a sheave wheel based on the hoist cable displacement; and
produce said output signal by producing an output signal representing an orientation and position of said hoist cable and adaptor.

21. The apparatus of claim 1 wherein said spatial positioning signal is encoded with values representing said orientation and displacement, and wherein said processor circuit is operably configured to:
extract said values; and
determine compliance of said values with a set of validity criteria prior to using said kinematic model of the loading equipment to compute said spatial positioning of the operating implement.

22. The apparatus of claim 1 wherein said processor circuit is operably configured to compute at least one of:
a cyclic activity parameter associated with operation of the loading equipment; and
a maximum swing angle and frequency associated with a side to side swing of a rotating platform of the loading equipment.

23. The apparatus of claim 1 wherein said output signal representing said spatial positioning is further provided to an image processing system, said image processing system being operably configured to capture and process images of the operating implement to determine at least one of:
a condition of the operating implement; and
a condition of a payload loaded by said operating implement.

24. A method for determining a spatial positioning of loading equipment, the loading equipment having an operating implement for loading a payload, the operating implement being coupled to a support for movement relative to the support, the method comprising:
receiving spatial positioning signals including:
an orientation signal from an orientation sensor disposed on the support, said orientation signal representing an orientation of the support; and
a displacement signal from a displacement sensor, said displacement signal representing a displacement of the operating implement relative to the support;
in response to receiving said spatial positioning signals:
using a kinematic model of the loading equipment to compute a spatial positioning of the loading equipment; and
producing an output signal representing said spatial positioning.

25. The method of claim 24 wherein said orientation sensor and said displacement sensor are operable to produce updated orientation and displacement signals during movement of the operating implement and wherein receiving said spatial positioning signals comprises receiving the updated signals and wherein producing said output signal comprises producing an output signal representing a dynamically updated spatial positioning of the loading equipment.

26. The method of claim 24 wherein receiving said spatial positioning signals comprises receiving a displacement signal from a displacement sensor disposed on the support.

27. The method of claim 24 wherein receiving the orientation signal and receiving the displacement signal comprises receiving orientation and displacement signals from respective orientation and displacement sensors each disposed in a sensor housing mounted on the support.

28. The method of claim 24 wherein receiving said spatial positioning signals comprises receiving a displacement signal from a displacement sensor disposed on the operating implement.

29. The method of claim 24 wherein receiving said orientation signal comprises receiving a signal including information indicating at least:
a cardinal heading of the support; and
a pitch angle of the support.

30. The method of claim 29 wherein receiving said orientation signal comprises receiving a signal including information indicating a roll angle of the support.

31. The method of claim 24 further comprising:
receiving coordinates defining a location of the loading equipment with respect to an earth coordinate system; and
using the coordinates and the computed spatial positioning to compute a location of the operating implement with respect to the earth coordinate system.

32. The method of claim 31 wherein the loading equipment comprises a mining shovel and further comprising correlating the computed location of the operating implement with map data representing a yield expected from ore at the location of the operating implement to provide a yield estimate for the ore loaded in the operating implement.

33. The method of claim 31 wherein receiving said coordinates comprises receiving GPS coordinates defining said location of the loading equipment.

34. The method of claim 24 wherein receiving said orientation signal from said orientation sensor comprises receiving a signal from a sensor comprising a plurality of sensor elements coupled to a microprocessor, said microprocessor being operably configured to produce said orientation signal in response to receiving signals from said plurality of sensor elements.

35. The method of claim 24 wherein receiving said displacement signal from said displacement sensor comprises receiving a signal from a laser rangefinder sensor, said laser rangefinder sensor being operable to direct a laser beam at a target located proximate the operating implement to determine said displacement of the operating implement relative to the support.

36. The method of claim 24 wherein producing said output signal comprises producing a display signal operable to cause a representation of the loading equipment to be displayed on a display, said representation being operable to communicate said spatial positioning to an operator of the loading equipment.

37. The method of claim 36 wherein producing said display signal comprises producing a display signal operable to cause display of at least one of:

an elevational representation of the loading equipment indicating said spatial positioning of the loading implement with respect to the loading equipment; and a plan representation of the loading equipment indicating a heading of the operating implement.

38. The method of claim 24 further comprising transmitting said output signal to a remote location to facilitate remote monitoring of loading equipment operations.

39. The method of claim 38 wherein transmitting said output signal comprises wirelessly transmitting said output signal to said remote location.

40. The method of claim 24 wherein the loading equipment comprises a mining shovel having a boom extending outwardly from a frame, and wherein:

said support is pivotably coupled to said boom;

the operating implement comprises a dipper handle having first and second ends, the first end being coupled to a dipper for loading ore from a mine face, the second end being received in said support and being coupled to a drive operable to cause linear reciprocating motion of the dipper handle and dipper with respect to the support; and wherein receiving said displacement signal comprises receiving a signal representing a generally linear displacement between said support and said dipper.

41. The method of claim 40 further comprising:

receiving a signal representing a pitch angle of the frame and a roll angle of the frame; and using said pitch and roll angles of the frame to compute an orientation of the frame prior to computing said spatial positioning of the loading equipment.

42. The method of claim 41 wherein using said kinematic model of the loading equipment to compute said spatial positioning of the operating implement comprises generating a kinematic model of the mining shovel wherein:

a coupling between a crawler platform and said frame is modeled as a first revolute joint;

a coupling between said frame and said boom is modeled as a second revolute joint;

a coupling between said boom and said support is modeled as a third revolute joint; and a coupling between said dipper handle and said support is modeled as a prismatic joint.

43. The method of claim 42 wherein the dipper is pivotably coupled to the first end of the dipper handle and comprises an adaptor for coupling to a hoist cable, the hoist cable extending over a point sheave disposed at a distal end of the boom, the hoist cable being operable to move the dipper about the first end of the dipper handle and to move the dipper and dipper handle about the support during loading operations, and further comprising:

computing an orientation and position of the adaptor based on a dipper tip and point sheave locations;

computing a length of the hoist cable between the adaptor and the point sheave;

computing a rotation of a sheave wheel based on the hoist cable displacement; and wherein producing said output signal comprises producing an output signal representing an orientation and position of said hoist cable and adaptor.

44. The method of claim 24 wherein receiving said spatial positioning signals further comprises receiving a spatial positioning signal encoded with values representing said orientation and displacement, and further comprising:

extracting said values; and determining compliance of said values with a set of validity criteria prior to using said kinematic model of the loading equipment to compute said spatial positioning of the operating implement.

45. The method of claim 24 further comprising computing at least one of:

a cyclic activity parameter associated with operation of the loading equipment; and a maximum swing angle and frequency associated with a side to side swing of a rotating platform of the loading equipment.

46. The method of claim 24 further comprising providing said output signal representing said spatial positioning to an image processing system, said image processing system being operably configured to capture and process images of the operating implement to determine at least one of:

a condition of the operating implement; and a condition of a payload loaded by said operating implement.

47. A sensor apparatus for producing spatial positioning signals for determining a spatial positioning of loading equipment, the loading equipment having an operating implement for loading a payload, the operating implement being coupled to a support for movement relative to the support, the sensor apparatus comprising:

a housing operably configured to be mounted on the support;

an orientation sensor and a displacement sensor disposed within the housing and being operably configured to produce spatial positioning signals including:

an orientation signal representing an orientation of the support; and a displacement signal representing a displacement of the operating implement relative to the support.

48. The apparatus of claim 47 further comprising a processor circuit operably configured to:

receive said spatial positioning signals;

use a kinematic model of the loading equipment to compute a spatial positioning of the operating implement with respect to the loading equipment; and produce an output signal representing said spatial positioning of the operating implement.

49. The apparatus of claim 48 wherein said support is disposed in a location that is exposed to an environment surrounding the loading equipment and further comprising a connector port operably configured to receive a cable for conveying said spatial positioning signals to a processor circuit located in an enclosed location on the loading equipment.

* * * * *